(12) United States Patent
Bulpett et al.

(10) Patent No.: US 9,072,943 B2
(45) Date of Patent: Jul. 7, 2015

(54) GOLF BALL COMPOSITIONS

(75) Inventors: David A. Bulpett, Boston, MA (US);
Michael J. Sullivan, Barrington, RI (US); Mark L. Binette, Mattapoisett, MA (US); Brian Comeau, Berkley, MA (US); Robert Blink, Newport, RI (US)

(73) Assignee: Acushnet Company, Fairhaven, MA (US)

( * ) Notice: Subject to any disclaimer, the term of this patent is extended or adjusted under 35 U.S.C. 154(b) by 323 days.

(21) Appl. No.: 13/613,048

(22) Filed: Sep. 13, 2012

(65) Prior Publication Data
US 2014/0073453 A1 Mar. 13, 2014

(51) Int. Cl.
| | |
|---|---|
| A63B 37/06 | (2006.01) |
| A63B 37/12 | (2006.01) |
| A63B 37/00 | (2006.01) |
| C08L 9/02 | (2006.01) |
| C08L 9/06 | (2006.01) |
| C08L 15/02 | (2006.01) |
| C08L 25/06 | (2006.01) |
| C08L 25/08 | (2006.01) |
| C08L 27/04 | (2006.01) |
| C08L 27/06 | (2006.01) |
| C08L 27/18 | (2006.01) |
| C08L 33/08 | (2006.01) |
| C08L 53/00 | (2006.01) |
| C08L 67/08 | (2006.01) |
| C08L 71/02 | (2006.01) |
| C08L 83/04 | (2006.01) |
| C08L 33/20 | (2006.01) |
| C08L 35/06 | (2006.01) |
| C08L 61/06 | (2006.01) |
| C08L 61/28 | (2006.01) |
| C08L 77/00 | (2006.01) |
| C08L 77/12 | (2006.01) |
| C08L 79/08 | (2006.01) |

(52) U.S. Cl.
CPC ............. *A63B 37/00* (2013.01); *A63B 37/12* (2013.01); *C08L 9/02* (2013.01); *C08L 9/06* (2013.01); *C08L 15/02* (2013.01); *C08L 25/06* (2013.01); *C08L 25/08* (2013.01); *C08L 27/04* (2013.01); *C08L 27/06* (2013.01); *C08L 27/18* (2013.01); *C08L 33/08* (2013.01); *C08L 53/00* (2013.01); *C08L 61/06* (2013.01); *C08L 61/28* (2013.01); *C08L 67/08* (2013.01); *C08L 71/02* (2013.01); *C08L 77/00* (2013.01); *C08L 77/12* (2013.01); *C08L 79/08* (2013.01); *C08L 83/04* (2013.01); *C08L 33/20* (2013.01); *C08L 35/06* (2013.01); *A63B 37/0074* (2013.01); *A63B 37/0075* (2013.01); *A63B 37/0047* (2013.01); *A63B 37/0024* (2013.01)

(58) Field of Classification Search
USPC .................................................. 473/351–378
See application file for complete search history.

(56) References Cited

U.S. PATENT DOCUMENTS

| | | | | |
|---|---|---|---|---|
| 5,050,886 | A * | 9/1991 | Yamagishi et al. | 473/372 |
| 5,733,974 | A | 3/1998 | Yamada et al. | |
| 5,779,561 | A | 7/1998 | Sullvian et al. | |
| 5,789,486 | A | 8/1998 | Maruoka et al. | |
| 5,967,907 | A * | 10/1999 | Takemura et al. | 473/373 |
| 6,186,906 | B1 * | 2/2001 | Sullivan et al. | 473/351 |
| 6,361,453 | B1 * | 3/2002 | Nakamura et al. | 473/371 |
| 6,465,573 | B1 | 10/2002 | Maruko et al. | |
| 6,905,647 | B2 * | 6/2005 | Endo et al. | 264/248 |
| 7,086,966 | B2 * | 8/2006 | Ohama et al. | 473/374 |
| 7,182,700 | B2 * | 2/2007 | Endo et al. | 473/374 |
| 7,402,114 | B2 | 7/2008 | Binette et al. | |
| 7,612,135 | B2 | 11/2009 | Kennedy, III et al. | |
| 8,845,458 | B2 * | 9/2014 | Shinohara | 473/377 |
| 2003/0216520 | A1 | 11/2003 | Irii et al. | |
| 2008/0234070 | A1 | 9/2008 | Comeau et al. | |
| 2012/0165122 | A1 | 6/2012 | Kim et al. | |

\* cited by examiner

*Primary Examiner* — Alvin Hunter
(74) *Attorney, Agent, or Firm* — Mandi B. Milbank

(57) ABSTRACT

Disclosed herein are heterogeneous golf ball compositions comprising a thermosetting polymer matrix and discrete particles of thermoplastic polymer dispersed within the matrix.

17 Claims, No Drawings

GOLF BALL COMPOSITIONS

FIELD OF THE INVENTION

The present invention is directed to golf ball compositions comprising discrete particles of unmelted thermoplastic polymer within a thermosetting polymer matrix.

BACKGROUND OF THE INVENTION

U.S. Pat. No. 5,789,486 to Maruoka et al. discloses a golf ball including a paint layer comprised of a dispersion of internally-crosslinked polymer gel fine particles.

U.S. Pat. No. 6,186,906 to Sullivan et al. discloses golf ball compositions comprising discrete particles of gel.

U.S. Pat. No. 7,402,114 to Binette et al. discloses golf ball materials comprising a partially to highly neutralized blend of copolymers, a fatty acid or fatty acid salt, and a heavy mass filler.

U.S. Pat. No. 7,612,135 to Kennedy, III et al. discloses golf ball materials comprising a partially to highly neutralized blend of an acid copolymer, a copolymer comprising a metallocene-catalyzed alpha-olefin and a softening comonomer, and a fatty acid or fatty acid salt.

U.S. Patent Application Publication No. 2008/0234070 to Comeau et al. discloses the use of crosslinked rubber nanoparticles in golf ball layers.

U.S. Pat. No. 5,733,974 to Yamada et al. discloses a golf ball comprising a core made of an elastomer and a cover covering said core wherein said cover is made of a thermoplastic material comprising a rubber powder and a thermoplastic elastomer.

U.S. Pat. No. 6,465,573 to Maruko et al. discloses a solid golf ball comprising a core, an intermediate layer, and a cover improved in rebound, distance, and feel when the intermediate layer is comprised of a thermoplastic resin in admixture with rubber powder.

U.S. Pat. No. 5,779,561 to Sullivan et al. discloses a golf ball including an inner cover layer comprising (1) a first resin composition containing at least 50 parts by weight of a non-ionomeric polyolefin material and (2) at least one part by weight of a filler.

U.S. Patent Application Publication No. 2003/0216520 to Irii et al. discloses a golf ball whose core is covered with a cover, wherein the core is constituted of a rubber composition containing polybutadiene rubber and the cover is constituted of a resin composition composed of ionomer resin and diene rubber.

U.S. Patent Application Publication No. 2012/0165122 to Kim et al. discloses a golf ball where at least one of the outer cover layer and the intermediate layer includes a blend composition of about 2 about 40 wt % of a polyamide and about 60 to about 98 wt % of one or more of either a block copolymer, an acidic copolymer; an acidic terpolymer; an ionomer, or a multi component blend composition; and wherein the polyamide has a melting point which is greater than about 5 and less than about 200° C. above the melting point of the other blend component.

U.S. Pat. No. 6,361,453 to Nakamura et al. discloses a solid golf ball having a solid core and a cover, the solid core is composed of a core-forming material and particles of a different material.

SUMMARY OF THE INVENTION

The present invention is directed to golf balls comprising a layer formed from a heterogeneous composition. The heterogeneous composition comprises a matrix formed from a thermosetting polymer composition and discrete particles of a thermoplastic polymer composition dispersed within the matrix. The thermoplastic polymer composition has a melting point above the curing temperature of the thermosetting polymer composition.

In a particular embodiment, the particles have a maximum particle size of 0.900 mm.

In another particular embodiment, the difference in the specific gravity of the thermosetting polymer composition and the specific gravity of the thermoplastic composition is at least 0.13 $g/cm^3$.

In another particular embodiment, the composition comprises at least 500 of the discrete particles.

In another particular embodiment, the particles have a maximum particle size of 0.900 mm and are present in the heterogeneous composition in an amount of 18 wt % or greater, based on the total weight of the heterogeneous composition, and the difference in the specific gravity of the thermosetting polymer composition and the specific gravity of the thermoplastic composition is at least 0.13 $g/cm^3$.

DETAILED DESCRIPTION

Golf ball compositions of the present invention are heterogeneous compositions comprising discrete unmelted thermoplastic particles dispersed within a thermosetting polymer matrix. The thermoplastic particle composition has a melting point above the curing temperature of the matrix composition such that the particles do not melt upon formation of the golf ball component formed from the heterogeneous composition.

In a particular embodiment, the difference in the specific gravity of the matrix composition and the specific gravity of the particle composition is at least 0.10 $g/cm^3$, or at least 0.11 $g/cm^3$, or at least 0.12 $g/cm^3$, or at least 0.13 $g/cm^3$, or at least 0.14 $g/cm^3$, or at least 0.15 $g/cm^3$, or at least 0.16 $g/cm^3$, or at least 0.17 $g/cm^3$, or at least 0.18 $g/cm^3$, or at least 0.19 $g/cm^3$, or at least 0.20 $g/cm^3$.

The heterogeneous composition is formed by adding the particles to the matrix composition either prior to forming the golf ball layer or during the process of molding or casting the golf ball layer.

In a particular embodiment, the heterogeneous composition has a solid sphere coefficient of restitution, "COR," within a range having a lower limit of 0.450 or 0.500 or 0.550 or 0.600 or 0.650 or 0.700 and an upper limit of 0.710 or 0.730 or 0.750 or 0.770 or 0.800 or 0.820 or 0.850 or 0.870 or 0.900 or 0.910 or 0.950. For purposes of the present disclosure, the "solid sphere COR" of a composition refers to the COR of a cured 1.55 inch diameter sphere of the composition. COR is determined according to a known procedure wherein a sphere is fired from an air cannon at two given velocities and calculated at a velocity of 125 ft/s. Ballistic light screens are located between the air cannon and the steel plate at a fixed distance to measure sphere velocity. As the sphere travels toward the steel plate, it activates each light screen, and the time at each light screen is measured. This provides an incoming transit time period inversely proportional to the sphere's incoming velocity. The sphere impacts the steel plate and rebounds though the light screens, which again measures the time period required to transit between the light screens. This provides an outgoing transit time period inversely proportional to the sphere's outgoing velocity. COR is then calculated as the ratio of the outgoing transit time period to the incoming transit time period, COR=$V_{out}/V_{in}=T_{in}/T_{out}$.

In a particular embodiment, the heterogeneous composition has a solid sphere compression within a range having a lower limit of −75 or −50 or −20 or 0 or 10 or 15 and an upper limit of 20 or 25 or 30 or 35 or 40 or 50. In another particular embodiment, the heterogeneous composition has a solid sphere compression within a range having a lower limit of 70 or 75 or 80 or 85 or 90 and an upper limit of 90 or 95 or 100 or 105 or 115 or 120 or 125. In another particular embodiment, the heterogeneous composition has a solid sphere compression within a range having a lower limit of 120 or 130 or 140 or 150 or 155 or 160 and an upper limit of 160 or 165 or 170 or 180 or 190 or 200. In another particular embodiment, the heterogeneous composition has a solid sphere compression of 130 or greater, or 140 or greater, or 150 or greater, or 155 or greater, or 160 or greater, or 165 or greater, or 170 or greater. For purposes of the present disclosure, the "solid sphere compression" of a composition refers to the compression of a cured 1.55 inch diameter sphere of the composition. The compression of the sphere is determined according to a known procedure, using a digital Atti compression test device, wherein a piston is used to compress a ball against a spring. Conversion from Atti compression to Riehle (cores), Riehle (balls), 100 kg deflection, 130-10 kg deflection or effective modulus can be carried out according to the formulas given in Jeff Dalton's *Compression by Any Other Name, Science and Golf IV, Proceedings of the World Scientific Congress of Golf* (Eric Thain ed., Routledge, 2002).

In a particular embodiment, the heterogeneous composition has a flexural modulus, as measured according to the method given in the Examples below, of 5 ksi or greater, 6 ksi or greater, or 8 ksi or greater, or 10 ksi or greater, or 15 ksi or greater, or 20 ksi or greater, or 25 ksi or greater, or 30 ksi or greater, or 35 ksi or greater, or 40 ksi or greater, or 45 ksi or greater, or 48 ksi or greater, or 50 ksi or greater, or 52 ksi or greater, or 55 ksi or greater, or 60 ksi or greater, or 63 ksi or greater, or 65 ksi or greater, or 70 ksi or greater, 100 ksi or greater, or 120 ksi or greater, or 150 ksi or greater, or 160 ksi or greater, or 170 ksi or greater, or 180 ksi or greater, or 195 ksi or greater, or a flexural modulus within a range having a lower limit of 5 or 6 or 8 or 10 or 15 or 20 or 25 or 30 or 35 or 40 or 45 or 48 or 50 or 52 or 55 or 55 or 60 or 63 or 65 or 70 ksi and an upper limit of 75 or 80 or 85 or 90 or 95 or 100 or 105 or 110 or 115 ksi, or a flexural modulus within a range having a lower limit of 20 or 25 or 30 or 35 or 40 or 45 or 50 or 55 or 60 ksi and an upper limit of 60 or 65 or 70 or 75 or 80 ksi, or a flexural modulus within a range having a lower limit of 50 or 60 or 70 or 90 or 120 or 130 and an upper limit of 150 or 170 or 200 or 210.

In a particular embodiment, the particles are present in the composition in an amount of 1 wt % or greater, or 2 wt % or greater, or 3 wt % or greater, or 5 wt % or greater, or 10 wt % or greater, or 15 wt % or greater, or 20 wt % or greater, or 25 wt % or greater, or 30 wt % or greater, or 35 wt % or greater, or 40 wt % or greater, or 45 wt % or greater, or 50 wt % or greater, or 55 wt % or greater, or 60 wt % or greater, or an amount within a range having a lower limit of 1 or 2 or 3 or 5 or 10 or 15 or 20 or 25 or 30 or 35 or 40 wt % and an upper limit of 50 or 55 or 60 or 65 or 70 or 75 or 80 or 85 or 90 wt %, based on the total weight of the composition.

In another particular embodiment, the composition comprises at least 500 of the discrete particles.

In a particular embodiment, the particles have a maximum particle size of 0.595 mm or 0.707 mm or 0.841 mm or 0.900 mm or 1.00 mm or 1.19 mm or 1.41 mm or 1.68 mm or 2.00 mm or 2.38 mm. In another embodiment, the crosslinked particles have a particle size within a range having a lower limit of 0.001 mm or 0.002 mm or 0.005 mm or 0.007 mm or 0.015 mm or 0.030 mm or 0.037 or 0.074 mm and an upper limit of 0.100 mm or 0.125 mm or 0.177 mm or 0.354 mm or 0.420 mm or 0.500 mm or 0.595 mm or 0.707 mm or 0.841 mm 1.000 mm or 1.19 mm or 1.41 mm or 1.68 mm or 2.00 mm or 2.38 mm.

Matrix Composition

Thermosetting compositions suitable for forming the matrix include natural rubbers, polybutadienes, polyisoprenes, ethylene propylene rubbers (EPR), ethylene-propylene-diene rubbers (EPDM), styrene-butadiene rubbers, butyl rubbers, halobutyl rubbers, polyurethanes, polyureas, acrylonitrile butadiene rubbers, polychloroprenes, alkyl acrylate rubbers, chlorinated isoprene rubbers, acrylonitrile chlorinated isoprene rubbers, polyalkenamers, phenol formaldehydes, melamine formaldehydes, polyepoxides, polysiloxanes, polyesters, alkyds, polyisocyanurates, polycyanurates, polyacrylates, and combinations of two or more thereof.

Non-limiting examples of suitable commercially available thermosetting materials are Buna CB high-cis neodymium-catalyzed polybutadiene rubbers, such as Buna CB 23, and Buna CB high-cis cobalt-catalyzed polybutadiene rubbers, such as Buna CB 1220 and 1221, commercially available from Lanxess Corporation; SE BR-1220, commercially available from The Dow Chemical Company; Europrene® NEOCIS® BR 40 and BR 60, commercially available from Polimeri Europa®; UBEPOL-BR® rubbers, commercially available from UBE Industries, Inc.; BR 01, commercially available from Japan Synthetic Rubber Co., Ltd.; Neodene high-cis neodymium-catalyzed polybutadiene rubbers, such as Neodene BR 40, commercially available from Karbochem; TP-301 transpolyisoprene, commercially available from Kuraray Co., Ltd.; Vestenamer® polyoctenamer, commercially available from Evonik Industries; Butyl 065 and Butyl 288 butyl rubbers, commercially available from ExxonMobil Chemical Company; Butyl 301 and Butyl 101-3, commercially available from Lanxess Corporation; Bromobutyl 2224 and Chlorobutyl 1066 halobutyl rubbers, commercially available from ExxonMobil Chemical Company; Bromobutyl X2 and Chlorobutyl 1240 halobutyl rubbers, commercially available from Lanxess Corporation; BromoButyl 2255 butyl rubber, commercially available from Japan Synthetic Rubber Co., Ltd.; Vistalon® 404 and Vistalon® 706 ethylene propylene rubbers, commercially available from ExxonMobil Chemical Company; Dutral CO 058 ethylene propylene rubber, commercially available from Polimeri Europa; Nordel® IP NDR 5565 and Nordel® IP 3670 ethylene-propylene-diene rubbers, commercially available from The Dow Chemical Company; EPT1045 and EPT1045 ethylene-propylene-diene rubbers, commercially available from Mitsui Corporation; Buna SE 1721 TE styrene-butadiene rubbers, commercially available from Lanxess Corporation; Afpol 1500 and Afpol 552 styrene-butadiene rubbers, commercially available from Karbochem; Nipol® DN407 and Nipol® 1041L acrylonitrile butadiene rubbers, commercially available from Zeon Chemicals, L.P.; Neoprene GRT and Neoprene AD30 polychloroprene rubbers; Vamac® ethylene acrylic elastomers, commercially available from E. I. du Pont de Nemours and Company; Hytemp® AR12 and AR214 alkyl acrylate rubbers, commercially available from Zeon Chemicals, L.P.; and Hypalon® chlorosulfonated polyethylene rubbers, commercially available from E. I. du Pont de Nemours and Company.

The matrix composition may contain one or more fillers. Exemplary fillers include precipitated hydrated silica, clay, talc, asbestos, glass fibers, aramid fibers, mica, calcium metasilicate, zinc sulfate, barium sulfate, zinc sulfide, lithopone, silicates, silicon carbide, diatomaceous earth, carbonates (e.g., calcium carbonate, zinc carbonate, barium carbonate, and magnesium carbonate), metals (e.g., titanium, tungsten, aluminum, bismuth, nickel, molybdenum, iron, lead, copper, boron, cobalt, beryllium, zinc, and tin), metal alloys (e.g., steel, brass, bronze, boron carbide whiskers, and tungsten carbide whiskers), oxides (e.g., zinc oxide, tin oxide, iron oxide, calcium oxide, aluminum oxide, titanium dioxide, magnesium oxide, and zirconium oxide), particulate carbonaceous materials (e.g., graphite, carbon black, cotton flock, natural bitumen, cellulose flock, and leather fiber), microballoons (e.g., glass and ceramic), fly ash, core material that is ground and recycled, nanofillers and combinations thereof.

The matrix composition may also contain one or more additives selected from processing aids, such as transpolyisoprene (e.g., TP-301 transpolyisoprene, commercially available from Kuraray Co., Ltd.) and transbutadiene rubber; processing oils; plasticizers; coloring agents; fluorescent agents; chemical blowing and foaming agents; defoaming agents; stabilizers; softening agents; impact modifiers; free radical scavengers; accelerators; scorch retarders; and the like.

Suitable rubbers are more fully described in, for example, U.S. Pat. Nos. 6,566,483, 6,695,718, 6,939,907, 7,041,721 and 7,138,460, the entire disclosures of which are hereby incorporated herein by reference. Particularly suitable diene rubber compositions are further disclosed, for example, in U.S. Patent Application Publication No. 2007/0093318, the entire disclosure of which is hereby incorporated herein by reference.

Particle Composition

Particle compositions of the present invention are thermoplastic. For purposes of the present invention, thermoplastics do not include polymers that degrade before they melt, such as poly-para-phenylene terephthalamide (e.g., Kevlar® para-aramid fibers).

Suitable compositions for forming the dispersed particles are selected from thermoplastic polymer compositions having a melting point above the curing temperature of the matrix composition. Particular examples of suitable thermoplastic compositions for forming the particles include ionomers, non-ionomeric acid copolymers, polyesters, polyamides, polyether amides, polyester amides, polyimides, polyurethanes, polyureas, polystyrenes, polyethylenes, polypropylenes, rubber-toughened polyolefins, styrenic copolymers and styrenic block copolymers, dynamically vulcanized elastomers, ethylene vinyl acetates, ethylene(meth)acrylate based polymers, ethylene elastomers, propylene elastomers, copolymers of ethylene and propylene, polyvinyl chlorides, polytetrafluoroethylene (e.g., Teflon® polytetrafluoroethylene, commercially available from E. I. du Pont de Nemours and Company), functionalized derivatives thereof, and combinations of two or more thereof.

Suitable ionomer compositions include partially neutralized ionomers and highly neutralized ionomers, including ionomers formed from blends of two or more partially neutralized ionomers, blends of two or more highly neutralized ionomers, and blends of one or more partially neutralized ionomers with one or more highly neutralized ionomers. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. As used herein, "(meth)acrylic acid" means methacrylic acid and/or acrylic acid. Likewise, "(meth)acrylate" means methacrylate and/or acrylate. Y is preferably selected from (meth) acrylate and alkyl(meth)acrylates wherein the alkyl groups have from 1 to 8 carbon atoms, including, but not limited to, n-butyl(meth)acrylate, isobutyl(meth)acrylate, methyl(meth) acrylate, and ethyl(meth)acrylate. Particularly preferred O/X/Y-type copolymers are ethylene/(meth)acrylic acid/n-butyl (meth)acrylate, ethylene/(meth)acrylic acid/isobutyl(meth) acrylate, ethylene/(meth)acrylic acid/methyl(meth)acrylate, and ethylene/(meth)acrylic acid/ethyl(meth)acrylate. The acid is typically present in the acid copolymer in an amount of 6 wt % or greater, or 9 wt % or greater, or 10 wt % or greater, or 11 wt % or greater, or 15 wt % or greater, or 16 wt % or greater, or in an amount within a range having a lower limit of 1 or 4 or 6 or 8 or 10 or 11 or 12 or 15 wt % and an upper limit of 15 or 16 or 17 or 19 or 20 or 20.5 or 21 or 25 or 30 or 35 or 40 wt %, based on the total weight of the acid copolymer. The acid copolymer is at least partially neutralized with a cation source, optionally in the presence of a high molecular weight organic acid, such as those disclosed in U.S. Pat. No. 6,756, 436, the entire disclosure of which is hereby incorporated herein by reference. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, tin, lithium, and rare earth metals. Suitable ionomers are further disclosed, for example, in U.S. Patent Application Publication Nos. 2005/0049367, 2005/ 0148725, 2005/0020741, 2004/0220343, and 2003/0130434, and U.S. Pat. Nos. 5,587,430, 5,691,418, 5,866,658, 6,100, 321, 6,562,906, 6,653,382, 6,777,472, 6,762,246, 6,815,480, and 6,953,820, the entire disclosures of which are hereby incorporated herein by reference.

Non-limiting examples of suitable commercially available thermoplastics are Surlyn® ionomers and DuPont® HPF 1000 and HPF 2000 highly neutralized ionomers, commercially available from E. I. du Pont de Nemours and Company; Clarix® ionomers, commercially available from A. Schulman, Inc.; Iotek® ionomers, commercially available from ExxonMobil Chemical Company; Amplify® IO ionomers, commercially available from The Dow Chemical Company; Amplify® GR functional polymers and Amplify® TY functional polymers, commercially available from The Dow Chemical Company; Fusabond® functionalized polymers, including ethylene vinyl acetates, polyethylenes, metallocene-catalyzed polyethylenes, ethylene propylene rubbers, and polypropylenes, commercially available from E. I. du Pont de Nemours and Company; Exxelor® maleic anhydride grafted polymers, including high density polyethylene, polypropylene, semi-crystalline ethylene copolymer, amorphous ethylene copolymer, commercially available from ExxonMobil Chemical Company; ExxonMobil® PP series polypropylene impact copolymers, such as PP7032E3, PP7032KN, PP7033E3, PP7684KN, commercially available from ExxonMobil Chemical Company; Vistamaxx® propylene-based elastomers, commercially available from ExxonMobil Chemical Company; Vistalon® EPDM rubbers, commercially available from ExxonMobil Chemical Company; Exact® plastomers, commercially available from ExxonMobil Chemical Company; Santoprene® thermoplastic vulcanized elastomers, commercially available from ExxonMobil Chemical Company; Nucrel® acid copolymers, commercially available from E. I. du Pont de Nemours and Company; Escor® acid copolymers, commercially available from ExxonMobil Chemical Company; Primacor® acid copolymers, commercially available from The Dow Chemical Company; Kraton® styrenic block copolymers, commercially available from Kraton Performance Polymers Inc.; Septon® styrenic block copolymers, commercially available from Kuraray Co., Ltd.; Lotader® ethylene acrylate based polymers, commercially available from Arkema Corporation; Polybond® grafted polyethylenes and polypropylenes, commercially available from Chemtura Corporation; Royaltuf® chemically modified EPDM, commercially available from Chemtura Corporation; Vestenamer® polyoctenamer, commercially available from Evonik Industries; Pebax® polyether and polyester amides, commercially available from Arkema Inc.; polyester-based thermoplastic elastomers, such as Hytrel® polyester elastomers, commercially available from E. I. du Pont de Nemours and Company, and Riteflex® polyester elastomers, commercially available from Ticona; Estane® thermoplastic polyurethanes, commercially available from The Lubrizol Corporation; Grivory® polyamides and Grilamid® polyamides, commercially available from EMS Grivory; Zytel® polyamide resins and Elvamide® nylon multipolymer resins, commercially available from E. I. du Pont de Nemours and Company; and Elvaloy® acrylate copolymer resins, commercially available from E. I. du Pont de Nemours and Company.

In a particular embodiment, the particle composition is formed from a blend of at least two different polymers. In a particular aspect of this embodiment, at least one polymer is an ionomer.

In another particular embodiment, the particle composition is formed from a blend of at least a first and a second ionomer.

In another particular embodiment, the particle composition is formed from a blend of one or more ionomers and one or more additional polymers selected from non-ionomeric polyolefins, polyesters, polyamides, polyurethanes, polystyrenes, and functionalized derivatives thereof.

In another particular embodiment, the particle composition is formed from a blend of at least a functionalized polyethylene and a functionalized polymer selected from polyethylenes, including metallocene-catalyzed and non-metallocene-catalyzed polyethylenes, ethylene vinyl acetates, ethylene acid copolymers, ethylene(meth)acrylate copolymers, ethylene elastomers, and polypropylenes. In a particular aspect of this embodiment, the functionalized polyethylene is a maleic anhydride-grafted polymer selected from ethylene homopolymers, ethylene-hexene copolymers, ethylene-octene copolymers, and ethylene-butene copolymers.

In another particular embodiment, the particle composition is formed from a blend of at least an ionomer, a functionalized polyethylene and a functionalized polymer selected from polyethylenes, including metallocene-catalyzed and non-metallocene-catalyzed polyethylenes, ethylene vinyl acetates, ethylene acid copolymers, ethylene(meth)acrylate copolymers, ethylene elastomers, and polypropylenes. In a particular aspect of this embodiment, the functionalized polyethylene is a maleic anhydride-grafted polymer selected from ethylene homopolymers, ethylene-hexene copolymers, ethylene-octene copolymers, and ethylene-butene copolymers.

In another particular embodiment, the particle composition is formed from a blend of at least an ionomer and a maleic anhydride-grafted polyethylene. In a particular aspect of this embodiment, the polyethylene is selected from ethylene homopolymers, ethylene-hexene copolymers, ethylene-octene copolymers, and ethylene-butene copolymers.

In another particular embodiment, the particle composition is formed from a blend of at least an ionomer and a functionalized polymer selected from polyethylenes, including metallocene-catalyzed and non-metallocene-catalyzed polyethylenes, ethylene vinyl acetates, ethylene acid copolymers, ethylene elastomers, and polypropylenes.

In another particular embodiment, the particle composition is formed from a blend of at least an ionomer and an acid copolymer.

In another particular embodiment, the particle composition is formed from a blend of at least an ionomer and a styrenic block copolymer or functionalized derivative thereof.

In another particular embodiment, the particle composition is formed from a blend of at least an ionomer and an ethylene (meth)acrylate based polymer or functionalized derivative thereof.

In another particular embodiment, the particle composition is formed from a blend of at least an ionomer and an EPDM or functionalized derivative thereof.

In another particular embodiment, the particle composition is formed from a blend of at least an ionomer and a polyoctenamer or a functionalized derivative thereof.

In another particular embodiment, the particle composition includes at least an ionomer, wherein the ionomer is a partially- or highly-neutralized very low acid ethylene copolymer.

In another particular embodiment, the particle composition is formed from a blend including at least a functionalized ethylene homopolymer or copolymer, including, but not limited to, functionalized ethylene(meth)acrylate copolymers, particularly, glycidyl methacrylate-grafted polyethylenes and glycidyl methacrylate-grafted ethylene/n-butyl acrylate copolymers.

In another particular embodiment, the particle composition is formed from a blend including at least an ionomer and a thermoplastic polyurethane. In a particular aspect of this embodiment, the polyurethane is selected from the polyurethanes disclosed in U.S. Patent Application Publication No. 2005/0256294, the entire disclosure of which is hereby incorporated herein by reference.

In another particular embodiment, the particle composition is formed from a blend including:
 (a) a first component selected from polyester elastomers (e.g., Hytrel® polyester elastomers, commercially available from E. I. du Pont de Nemours and Company, and Riteflex® polyester elastomers, commercially available from Ticona); polyether block amides (e.g., Pebax® polyether and polyester amides); polyester-ether amides; and polypropylene ether glycol compositions, such as those disclosed, e.g., in U.S. Patent Application Publication No. 2005/0256294, the entire disclosure of which is hereby incorporated herein by reference; and combinations of two or more thereof;
 (b) a second component selected from O/X/Y-type ionomers, including partially and highly-neutralized ionomers, particularly highly neutralized ionomers comprising fatty acid salts, such as DuPont® HPF 1000 and HPF 2000 highly neutralized ionomers, and VLMI-type ionomers, such as Surlyn® 9320 ionomer; O/X/Y-type acid copolymers; and polyamides and polyamide blends, particularly selected from the polyamides and polyamide blends disclosed above.

In a particular aspect of this embodiment, the particle composition is formed from a blend including at least a polyester elastomer and a highly neutralized ionomer comprising fatty acid salts. Such blend is disclosed, for example, in U.S. Pat. No. 7,375,151, the entire disclosure of which is hereby incorporated herein by reference.

In another particular embodiment, the particle composition is formed from a blend including at least a polyester, an ionomer, and a grafted EPDM. Such blends are further disclosed, for example, in U.S. Pat. No. 4,303,573, the entire disclosure of which is hereby incorporated herein by reference.

In another particular embodiment, the particle composition is a non-halogenated thermoplastic polymer composition.

In another particular embodiment, the particle composition is a non-chlorinated thermoplastic polymer composition. In a particular aspect of this embodiment, the particle composition does not comprise a polyvinyl chloride.

In another particular embodiment, the particle composition is selected from polycarbonates, polyamides, and polyether and polyester amides (e.g., Pebax® thermoplastic polyether and polyester amides). In another particular embodiment, the particle composition does not include polyamide.

In a particular embodiment, the particle composition comprises a base polymer, the base polymer having a specific gravity of 1.40 g/cm$^3$ or less, or less than 1.40 g/cm$^3$, or 1.38 g/cm$^3$ or less, or less than 1.38 g/cm$^3$, or 1.35 g/cm$^3$ or less, or less than 1.30 g/cm$^3$, or 1.31 g/cm$^3$ or less, or 1.30 g/cm$^3$ or less, or 1.25 g/cm$^3$ or less, or 1.20 g/cm$^3$ or less, or 1.15 g/cm$^3$ or less, or 1.10 g/cm$^3$ or less. In another particular embodiment, the particle composition comprises a base polymer, the base polymer having a specific gravity of 1.40 g/cm$^3$ or greater, or greater than 1.40 g/cm$^3$, or 1.41 g/cm$^3$ or greater, or greater than 1.41 g/cm$^3$, or 1.42 g/cm$^3$ or greater, or greater than 1.42 g/cm$^3$, or 1.43 g/cm$^3$ or greater, or 1.44 g/cm$^3$ or greater, or 1.45 g/cm$^3$ or greater, or greater than 1.45 g/cm$^3$, or 1.46 g/cm$^3$ or greater, or 1.47 g/cm$^3$ or greater, or 1.50 g/cm$^3$ or greater, or greater than 1.50 g/cm$^3$, or 1.55 g/cm$^3$ or greater, or 1.60 g/cm$^3$ or greater, or greater than 1.60 g/cm$^3$, or 1.70 g/cm$^3$ or greater, or 1.75 g/cm$^3$ or greater, or 1.80 g/cm$^3$ or greater.

The particle composition optionally includes additive(s) and/or filler(s) in an amount of 50 wt % or less, or 30 wt % or less, or 20 wt % or less, or 15 wt % or less, based on the total weight of the matrix composition. Suitable additives and fillers include, but are not limited to, chemical blowing and foaming agents, optical brighteners, coloring agents, fluorescent agents, whitening agents, UV absorbers, light stabilizers, defoaming agents, processing aids, antioxidants, stabilizers, softening agents, fragrance components, plasticizers, impact modifiers, TiO$_2$, acid copolymer wax, surfactants, performance additives (e.g., A-C® performance additives, particularly A-C® low molecular weight ionomers and copolymers, A-C® oxidized polyethylenes, and A-C® ethylene vinyl acetate waxes, commercially available from Honeywell International Inc.), fatty acid amides (e.g., ethylene bis-stearamide and ethylene bis-oleamide), fatty acids and salts thereof (e.g., stearic acid, oleic acid, zinc stearate, magnesium stearate, zinc oleate, and magnesium oleate), and fillers, such as zinc oxide, tin oxide, barium sulfate, zinc sulfate, calcium oxide, calcium carbonate, zinc carbonate, barium carbonate, tungsten, tungsten carbide, silica, lead silicate, clay, mica, talc, nano-fillers, carbon black, glass flake, milled glass, flock, fibers, and mixtures thereof. Suitable additives are more fully described in, for example, U.S. Patent Application Publication No. 2003/0225197, the entire disclosure of which is hereby incorporated herein by reference. In a particular embodiment, the total amount of additive(s) and filler(s) present in the particle composition is 20 wt % or less, or 15 wt % or less, or 12 wt % or less, or 10 wt % or less, or 9 wt % or less, or 6 wt % or less, or 5 wt % or less, or 4 wt % or less, or 3 wt % or less, or within a range having a lower limit of 0 or 2 or 3 or 5 wt %, based on the total weight of the particle composition, and an upper limit of 9 or 10 or 12 or 15 or 20 wt %, based on the total weight of the particle composition. In a particular aspect of this embodiment, the particle composition includes filler(s) selected from carbon black, micro- and nano-scale clays and organoclays, including (e.g., Cloisite® and Nanofil® nanoclays, commercially available from Southern Clay Products, Inc.; Nanomax® and Nanomer® nanoclays, commercially available from Nanocor, Inc., and Perkalite® nanoclays, commercially available from Akzo Nobel Polymer Chemicals), micro- and nano-scale talcs (e.g., Luzenac HAR® high aspect ratio talcs, commercially available from Luzenac America, Inc.), glass (e.g., glass flake, milled glass, microglass, and glass fibers), micro- and nano-scale mica and mica-based pigments (e.g., Iriodin® pearl luster pigments, commercially available from The Merck Group), and combinations thereof. Particularly suitable combinations of fillers include, but are not limited to, micro-scale filler(s) combined with nano-scale filler(s), and organic filler(s) with inorganic filler(s).

The particle composition optionally includes one or more melt flow modifiers. Suitable melt flow modifiers include materials which increase the melt flow of the composition, as measured using ASTM D-1238, condition E, at 190° C., using a 2160 gram weight. Examples of suitable melt flow modifiers include, but are not limited to, fatty acids and fatty acid salts, including, but not limited to, those disclosed in U.S. Pat. No. 5,306,760, the entire disclosure of which is hereby incorporated herein by reference; fatty amides and salts thereof; polyhydric alcohols, including, but not limited to, those disclosed in U.S. Pat. No. 7,365,128, and U.S. Patent Application Publication No. 2010/0099514, the entire disclosures of which are hereby incorporated herein by reference; polylactic acids, including, but not limited to, those disclosed in U.S. Pat. No. 7,642,319, the entire disclosure of which is hereby incorporated herein by reference; and the modifiers disclosed in U.S. Patent Application Publication No. 2010/0099514 and 2009/0203469, the entire disclosures of which are hereby incorporated herein by reference. Flow enhancing additives also include, but are not limited to, montanic acids, esters of montanic acids and salts thereof, bis-stearoylethylenediamine, mono- and polyalcohol esters such as pentaerythritol tetrastearate, zwitterionic compounds, and metallocene-catalyzed polyethylene and polypropylene wax, including maleic anhydride modified versions thereof, amide waxes and alkylene diamides such as bistearamides. Particularly suitable fatty amides include, but are not limited to, saturated fatty acid monoamides (e.g., lauramide, palmitamide, arachidamide behenamide, stearamide, and 12-hydroxy stearamide); unsaturated fatty acid monoamides (e.g., oleamide, erucamide, and ricinoleamide); N-substituted fatty acid amides (e.g., N-stearyl stearamide, N-behenyl behenamide, N-stearyl behenamide, N-behenyl stearamide, N-oleyl oleamide, N-oleyl stearamide, N-stearyl oleamide, N-stearyl erucamide, erucyl erucamide, and erucyl stearamide, N-oleyl palmitamide, methylol amide (more preferably, methylol stearamide, methylol behenamide); saturated fatty acid bis-amides (e.g., methylene bis-stearamide, ethylene bis-stearamide, ethylene bis-isostearamide, ethylene bis-hydroxystearamide, ethylene bis-behenamide, hexamethylene bis-stearamide, hexamethylene bis-behenamide, hexamethylene bis-hydroxystearamide, N,N'-distearyl adipamide, and N,N'-distearyl sebacamide); unsaturated fatty acid bis-amides (e.g., ethylene bis-oleamide, hexamethylene bis-oleamide, N,N'-dioleyl adipamide, N,N'-dioleyl sebacamide); and saturated and unsaturated fatty acid tetra amides, stearyl erucamide, ethylene bis stearamide and ethylene bis oleamide. Suitable examples of commercially available fatty amides include, but are not limited to, Kemamide® fatty acids, such as Kemamide® B (behenamide/arachidamide), Kemamide® W40 (N,N'-ethylenebisstearamide), Kemamide® P181 (oleyl palmitamide), Kemamide® S (stearamide), Kemamide® U (oleamide), Kemamide® E (erucamide), Kemamide® O (oleamide), Kemamide® W45 (N,N'-ethylenebisstearamide), Kenamide® W20 (N,N'-ethylenebisoleamide), Kemamide® E180 (stearyl erucamide), Kemamide® E221 (erucyl erucamide), Kemamide® S180 (stearyl stearamide), Kemamide® S221 (erucyl stearamide), commercially available from Chemtura Corporation; and Crodamide® fatty amides, such as Crodamide® OR (oleamide), Crodamide® ER (erucamide), Crodamide® SR (stereamide), Crodamide® BR (behenamide), Crodamide® 203 (oleyl palmitamide), and Crodamide® 212 (stearyl erucamide), commercially available from Croda Universal Ltd.

In a particular embodiment, the particle composition has a Shore D hardness within a limit having a lower limit of 20 or 30 or 35 or 45 and an upper limit of 55 or 60 or 65 or 70 or 75 or 80 or 85 or 90 or 95, or a Shore D hardness of 65 or greater, or 70 or greater, or 75 or greater, or 80 or greater, or 90 or greater.

Golf Ball Applications

Golf ball compositions according to the present invention can be used in a variety of constructions. For example, the compositions are suitable for use in one-piece, two-piece (i.e., a core and a cover), multi-layer (i.e., a core of one or more layers and a cover of one or more layers), and wound golf balls, having a variety of core structures, intermediate layers, covers, and coatings.

In golf balls of the present invention, at least one layer comprises a heterogeneous composition comprising discrete unmelted thermoplastic particles dispersed within a thermosetting matrix, as described herein. In golf balls having two or more layers comprising a composition of the present invention, the inventive composition of one layer may be the same as or a different inventive composition than another layer. The layer(s) comprising a composition of the present invention can be any one or more of a core layer, an intermediate layer, or a cover layer.

Core Layer(s)

Cores of the golf balls formed according to the invention may be solid, semi-solid, hollow, fluid-, powder-, or gas-filled, and may be one-piece or multi-layered. Multilayer cores include a center, innermost portion, which may be solid, semi-solid, hollow, fluid-, powder-, or gas-filled, surrounded by at least one outer core layer. The outer core layer may be solid, or it may be a wound layer formed of a tensioned elastomeric material. For purposes of the present disclosure, the term "semi-solid" refers to a paste, a gel, or the like.

In a particular embodiment, the present invention provides a golf ball having an innermost core layer formed from a heterogeneous composition of the present invention. In another particular embodiment, the present invention provides a golf ball having an outer core layer formed from a heterogeneous composition of the present invention. In another particular embodiment, the present invention provides a golf ball having an intermediate core layer formed from a heterogeneous composition of the present invention.

Golf ball cores of the present invention may include one or more layers formed from a suitable material other than a heterogeneous composition of the present invention. Suitable core materials include, but are not limited to, thermoset materials, such as styrene butadiene rubber, polybutadiene, synthetic or natural polyisoprene, and trans-polyisoprene; thermoplastics, such as ionomer resins, polyamides and polyesters; and thermoplastic and thermoset polyurethane and polyureas.

Intermediate Layer(s)

When the golf ball of the present invention includes one or more intermediate layers, i.e., layer(s) disposed between the core and the cover of a golf ball, each intermediate layer can include any materials known to those of ordinary skill in the art including thermoplastic and thermosetting materials.

In one embodiment, the present invention provides a golf ball having an intermediate layer formed from a heterogeneous composition of the present invention.

Also suitable for forming intermediate layer(s) are the compositions disclosed above for forming core layers.

A moisture vapor barrier layer is optionally employed between the core and the cover. Moisture vapor barrier layers are further disclosed, for example, in U.S. Pat. Nos. 6,632,147, 6,838,028, 6,932,720, 7,004,854, and 7,182,702, and U.S. Patent Application Publication Nos. 2003/0069082, 2003/0069085, 2003/0130062, 2004/0147344, 2004/0185963, 2006/0068938, 2006/0128505 and 2007/0129172, the entire disclosures of which are hereby incorporated herein by reference.

Cover

Golf ball covers of the present invention include single, dual, and multilayer covers. Dual and multilayer covers have an inner cover layer and an outer cover layer, and multilayer covers additionally have at least one intermediate cover layer disposed between the inner cover layer and the outer cover layer.

In a particular embodiment, the present invention provides a golf ball having an outermost cover layer formed from a heterogeneous composition of the present invention. In another particular embodiment, the present invention provides a golf ball having an inner cover layer formed from a heterogeneous composition of the present invention. In another particular embodiment, the present invention provides a golf ball having an intermediate cover layer formed from a heterogeneous composition of the present invention.

Golf ball covers of the present invention may include one or more layers formed from a suitable material other than a heterogeneous composition of the present invention. The cover material is preferably a tough, cut-resistant material, selected based on the desired performance characteristics. Suitable cover materials for the golf balls disclosed herein include, but are not limited to, polyurethanes, polyureas, and hybrids of polyurethane and polyurea; ionomer resins and blends thereof (e.g., Surlyn® ionomer resins and DuPont® HPF 1000 and HPF 2000 highly neutralized ionomers, commercially available from E. I. du Pont de Nemours and Company; Iotek® ionomers, commercially available from Exxon-Mobil Chemical Company; Amplify® IO ionomers of ethylene acrylic acid copolymers, commercially available from The Dow Chemical Company; and Clarix® ionomer resins, commercially available from A. Schulman Inc.); polyisoprene; polyoctenamer, such as Vestenamer® polyoctenamer, commercially available from Evonik Industries; polyethylene, including, for example, low density polyethylene, linear low density polyethylene, and high density polyethylene; polypropylene; rubber-toughened olefin polymers; non-ionomeric acid copolymers, e.g., ethylene(meth)acrylic acid; plastomers; flexomers; styrene/butadiene/styrene block copolymers; polybutadiene; styrene butadiene rubber; ethylene propylene rubber; ethylene propylene diene rubber; styrene/ethylene-butylene/styrene block copolymers; dynamically vulcanized elastomers; ethylene vinyl acetates; ethylene (meth)acrylates; polyvinyl chloride resins; polyamides, amide-ester elastomers, and copolymers of ionomer and polyamide, including, for example, Pebax® thermoplastic polyether and polyester amides, commercially available from Arkema Inc; crosslinked trans-polyisoprene and blends thereof; polyester-based thermoplastic elastomers, such as Hytrel® polyester elastomers, commercially available from E. I. du Pont de Nemours and Company, and Riteflex® polyester elastomers, commercially available from Ticona; polyurethane-based thermoplastic elastomers, such as Elastollan®, commercially available from BASF; synthetic or natural vulcanized rubber; and combinations thereof.

Polyurethanes, polyureas, and polyurethane-polyurea hybrids (i.e., blends and copolymers of polyurethanes and polyureas) are particularly suitable for forming cover layers of the present invention. Suitable polyurethanes and polyureas are further disclosed, for example, in U.S. Pat. Nos. 5,334,673, 5,484,870, 6,506,851, 6,756,436, 6,835,794, 6,867,279, 6,960,630, and 7,105,623; U.S. Patent Application Publication No. 2009/0011868; and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Compositions comprising an ionomer or a blend of two or more ionomers are also particularly suitable for forming cover layers. Preferred ionomeric cover compositions include:

(a) a composition comprising a "high acid ionomer" (i.e., having an acid content of greater than 16 wt %), such as Surlyn® 8150;

(b) a composition comprising a high acid ionomer and a maleic anhydride-grafted non-ionomeric polymer (e.g., Fusabond® functionalized polymers). A particularly preferred blend of high acid ionomer and maleic anhydride-grafted polymer is a 84 wt %/16 wt % blend of Surlyn® 8150 and Fusabond®. Blends of high acid ionomers with maleic anhydride-grafted polymers are further disclosed, for example, in U.S. Pat. Nos. 6,992,135 and 6,677,401, the entire disclosures of which are hereby incorporated herein by reference;

(c) a composition comprising a 50/45/5 blend of Surlyn® 8940/Surlyn® 9650/Nucrel® 960, preferably having a material hardness of from 80 to 85 Shore C;

(d) a composition comprising a 50/25/25 blend of Surlyn® 8940/Surlyn® 9650/Surlyn® 9910, preferably having a material hardness of about 90 Shore C;

(e) a composition comprising a 50/50 blend of Surlyn® 8940/Surlyn® 9650, preferably having a material hardness of about 86 Shore C;

(f) a composition comprising a blend of Surlyn® 7940/ Surlyn® 8940, optionally including a melt flow modifier;

(g) a composition comprising a blend of a first high acid ionomer and a second high acid ionomer, wherein the first high acid ionomer is neutralized with a different cation than the second high acid ionomer (e.g., 50/50 blend of Surlyn® 8150 and Surlyn® 9150), optionally including one or more melt flow modifiers such as an ionomer, ethylene-acid polymer or ester polymer; and (h) a composition comprising a blend of a first high acid ionomer and a second high acid ionomer, wherein the first high acid ionomer is neutralized with a different cation than the second high acid ionomer, and from 0 to 10 wt % of an ethylene/acid/ester ionomer wherein the ethylene/acid/ester ionomer is neutralized with the same cation as either the first high acid ionomer or the second high acid ionomer or a different cation than the first and second high acid ionomers (e.g., a blend of 40-50 wt % Surlyn® 8150, 40-50 wt % Surlyn® 9120, and 0-10 wt % Surlyn® 6320).

Surlyn 8150® and Surlyn® 8940 are different grades of E/MAA copolymer in which the acid groups have been partially neutralized with sodium ions. Surlyn® 9650, Surlyn® 9910, Surlyn® 9150, and Surlyn® 9120 are different grades of E/MAA copolymer in which the acid groups have been partially neutralized with zinc ions. Surlyn® 7940 is an E/MAA copolymer in which the acid groups have been partially neutralized with lithium ions. Surlyn® 6320 is a very low modulus magnesium ionomer with a medium acid content. Nucrel® 960 is an E/MAA copolymer resin nominally made with 15 wt % methacrylic acid. Surlyn® ionomers, Fusabond® polymers, and Nucrel® copolymers are commercially available from E. I. du Pont de Nemours and Company.

Ionomeric cover compositions can be blended with non-ionic thermoplastic resins, such as polyurethane, poly-etherester, poly-amide-ether, polyether-urea, thermoplastic polyether block amides (e.g., Pebax® polyether and polyester amides, commercially available from Arkema Inc.), styrene-butadiene-styrene block copolymers, styrene(ethylene-butylene)-styrene block copolymers, polyamides, polyesters, polyolefins (e.g., polyethylene, polypropylene, ethylene-propylene copolymers, polyethylene-(meth)acrylate, polyethylene-(meth)acrylic acid, functionalized polymers with maleic anhydride grafting, Fusabond® functionalized polymers commercially available from E. I. du Pont de Nemours and Company, functionalized polymers with epoxidation, elastomers (e.g., ethylene propylene diene monomer rubber, metallocene-catalyzed polyolefin) and ground powders of thermoset elastomers.

Ionomer golf ball cover compositions may include a flow modifier, such as, but not limited to, acid copolymer resins (e.g., Nucrel® acid copolymer resins, and particularly Nucrel® 960, commercially available from E. I. du Pont de Nemours and Company), performance additives (e.g., A-C® performance additives, particularly A-C® low molecular weight ionomers and copolymers, A-C® oxidized polyethylenes, and A-C® ethylene vinyl acetate waxes, commercially available from Honeywell International Inc.), fatty acid amides (e.g., ethylene bis-stearamide and ethylene bis-oleamide), fatty acids and salts thereof Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference.

Suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

Component Dimensions

Dimensions of golf ball components, i.e., thickness and diameter, may vary depending on the desired properties. For the purposes of the invention, any layer thickness may be employed.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred, however diameters anywhere in the range of from 1.7 to about 1.95 inches can be used.

Golf ball cores of the present invention include single, dual, and multilayer cores, and preferably have an overall diameter within the range having a lower limit of 0.75 inches or 1 inch or 1.25 inches or 1.4 inches and an upper limit of 1.55 inches or 1.6 inches or 1.62 inches or 1.63 inches. In a particular embodiment, the golf ball comprises a core and a cover, wherein the core is a solid, single layer having a diameter within a range having a lower limit of 0.750 or 1.00 or 1.10 or 1.15 or 1.20 or 1.25 or 1.30 or 1.40 or 1.50 or 1.53 or 1.55 inches and an upper limit of 1.55 or 1.60 or 1.62 or 1.63 or 1.65 inches. In another particular embodiment, the golf ball comprises a core and a cover, wherein the core comprises an inner core layer and an outer core layer, the inner core layer having a diameter within a range having a lower limit of 0.500 or 0.750 or 0.900 or 0.950 or 1.000 inches and an upper limit of 1.100 or 1.200 or 1.250 or 1.400 or 1.550 or 1.570 or 1.580 inches, and the outer core having a thickness within the range having a lower limit of 0.020 or 0.025 or 0.032 or 0.050 or 0.100 or 0.200 inches and an upper limit of 0.310 or 0.440 or 0.500 or 0.560 or 0.800 inches.

When present in a golf ball of the present invention, each intermediate layer has a thickness within a range having a lower limit of 0.002 or 0.010 or 0.020 or 0.025 or 0.030 inches and an upper limit of 0.035 or 0.040 or 0.045 or 0.050 or 0.060 or 0.090 or 0.100 or 0.150 or 0.200 inches. The total thickness of intermediate core layer(s) in golf balls of the present invention is preferably within the range having a lower limit of 0.020 or 0.0250 or 0.032 inches and an upper limit of 0.150 or 0.220 or 0.28 inches.

Golf ball covers of the present invention include single, dual, and multilayer covers, and preferably have an overall thickness within the range having a lower limit of 0.01 inches or 0.02 inches or 0.025 inches or 0.03 inches or 0.04 inches or 0.045 inches or 0.05 inches or 0.06 inches and an upper limit of 0.07 inches or 0.075 inches or 0.08 inches or 0.09 inches or 0.1 inches or 0.15 inches or 0.2 inches or 0.3 inches or 0.5 inches. Dual and multilayer covers have an inner cover layer and an outer cover layer, and multilayer covers additionally have at least one intermediate cover layer disposed between the inner cover layer and the outer cover layer. In a particular embodiment, the cover is a single layer having a thickness within a range having a lower limit of 0.020 or 0.025 or 0.030 inches and an upper limit of 0.030 or 0.040 or 0.045 or 0.050 or 0.070 or 0.100 or 0.120 or 0.150 or 0.350 or 0.400 or inches. In another particular embodiment, the cover comprises an inner cover layer and an outer cover layer, the inner cover having a thickness within a range having a lower limit of 0.010 or 0.020 or 0.025 or 0.030 inches and an upper limit of 0.035 or 0.040 or 0.050 or 0.150 or 0.200 inches, and the outer cover having a thickness within a range having a lower limit of 0.010 or 0.020 or 0.025 or 0.030 inches and an upper limit of 0.035 or 0.040 or 0.050 inches.

The golf balls of the present invention may be painted, coated, or surface treated for further benefits.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising a layer formed from a heterogeneous composition, the heterogeneous composition comprising:
   a matrix formed from a thermosetting polymer composition, and
   discrete particles of a thermoplastic polymer composition dispersed within the matrix, the thermoplastic polymer composition having a melting point above the curing temperature of the thermosetting polymer composition,
   wherein the particles have a maximum particle size of 0.900 mm; and
   wherein the golf ball comprises a core and a cover, and wherein the cover comprises the layer formed from the heterogeneous composition.

2. The golf ball of claim 1, wherein the discrete particles are present in the composition in an amount of 18 wt % or greater, based on the total weight of the composition.

3. The golf ball of claim 1, wherein the discrete particles are present in the composition in an amount of 20 wt % or greater, based on the total weight of the composition.

4. The golf ball of claim 1, wherein the particles have a maximum particle size of 0.841 mm.

5. A golf ball comprising a layer formed from a heterogeneous composition, the heterogeneous composition comprising:
   a matrix formed from a thermosetting polymer composition, and
   discrete particles of a thermoplastic polymer composition dispersed within the matrix, the thermoplastic composition having a melting point above the curing temperature of the thermosetting composition,
   wherein the difference in the specific gravity of the thermosetting polymer composition and the specific gravity of the thermoplastic composition is at least 0.13 g/cm$^3$; and
   wherein the golf ball comprises a core and a cover, and wherein the cover comprises the layer formed from the heterogeneous composition.

6. The golf ball of claim 5, wherein the difference in the specific gravity of the thermosetting polymer composition and the specific gravity of the thermoplastic composition is at least 0.15 g/cm$^3$.

7. The golf ball of claim 5, wherein the discrete particles are present in the composition in an amount of 18 wt % or greater, based on the total weight of the composition.

8. The golf ball of claim 5, wherein the discrete particles are present in the composition in an amount of 20 wt % or greater, based on the total weight of the composition.

9. The golf ball of claim 5, wherein the particles have a maximum particle size of 0.841 mm.

10. A golf ball comprising a layer formed from a heterogeneous composition, the heterogeneous composition comprising:
    a matrix formed from a thermosetting polymer composition, and discrete particles of a thermoplastic polymer composition dispersed within the matrix, the thermoplastic composition having a melting point above the curing temperature of the thermosetting composition, wherein the difference in the specific gravity of the thermosetting polymer composition and the specific gravity of the thermoplastic composition is at least 0.13 g/cm$^3$; and wherein the golf ball comprises a core, a cover, and an intermediate layer disposed between the core and the cover, wherein the intermediate layer is formed from the heterogeneous composition.

11. A golf ball comprising a layer formed from a heterogeneous composition, the heterogeneous composition comprising:

a matrix formed from a thermosetting polymer composition, and discrete particles of a thermoplastic polymer composition dispersed within the matrix, the thermoplastic composition having a melting point above the curing temperature of the thermosetting composition, wherein the composition comprises at least 500 of the discrete particles; and wherein the golf ball comprises a core, a cover, and an intermediate layer disposed between the core and the cover, wherein the intermediate layer is formed from the heterogeneous composition.

12. The golf ball of claim 11, wherein the particles have a maximum particle size of 0.841 mm.

13. The golf ball of claim 12, wherein the discrete particles are present in the composition in an amount of 18 wt % or greater, based on the total weight of the composition.

14. The golf ball of claim 12, wherein the discrete particles are present in the composition in an amount of 20 wt % or greater, based on the total weight of the composition.

15. A golf ball comprising a layer formed from a heterogeneous composition, the heterogeneous composition comprising:

a matrix formed from a thermosetting polymer composition, and discrete particles of a thermoplastic polymer composition dispersed within the matrix, the thermoplastic composition having a melting point above the curing temperature of the thermosetting composition, wherein the composition comprises at least 500 of the discrete particles; and wherein the golf ball comprises a core and a cover, and wherein the cover comprises the layer formed from the heterogeneous composition.

16. The golf ball of claim 11, wherein the difference in the specific gravity of the thermosetting polymer composition and the specific gravity of the thermoplastic composition is at least 0.11 g/cm$^3$.

17. A golf ball comprising a layer formed from a heterogeneous composition, the heterogeneous composition comprising:

a matrix formed from a thermosetting polymer composition, and discrete particles of a thermoplastic polymer composition dispersed within the matrix, the thermoplastic polymer composition having a melting point above the curing temperature of the thermosetting polymer composition, wherein the particles have a maximum particle size of 0.900 mm and are present in the heterogeneous composition in an amount of 18 wt % or greater, based on the total weight of the heterogeneous composition, and wherein the difference in the specific gravity of the thermosetting polymer composition and the specific gravity of the thermoplastic composition is at least 0.13 g/cm$^3$;

wherein the thermosetting matrix composition is selected from the group consisting of ethylene propylene rubbers, ethylene-propylene-diene rubbers, styrene-butadiene rubbers, butyl rubbers, halobutyl rubbers, acrylonitrile butadiene rubbers, polychloroprenes, alkyl acrylate rubbers, chlorinated isoprene rubbers, acrylonitrile chlorinated isoprene rubbers, polyalkenamers, phenol formaldehydes, melamine formaldehydes, polyepoxides, polyimides, polysiloxanes, alkyds, polyisocyanurates, polycyanurates, polyacrylates, and combinations of two or more thereof.

* * * * *